United States Patent [19]

Takeuchi et al.

[11] Patent Number: 4,910,517
[45] Date of Patent: Mar. 20, 1990

[54] DIGITAL DATA DETECTOR

[75] Inventors: Hitoshi Takeuchi, Nara; Taizo Sasada, Hirakata, both of Japan

[73] Assignee: Sharp Kabushiki Kaisha, Osaka, Japan

[21] Appl. No.: 221,871

[22] Filed: Jul. 20, 1988

[30] Foreign Application Priority Data

Jul. 22, 1987 [JP] Japan ................. 62-182985

[51] Int. Cl.$^4$ .......................... H03M 3/00
[52] U.S. Cl. .................... 341/122; 341/68; 341/77
[58] Field of Search ............. 341/68, 69, 72, 77, 341/122, 123, 124

[56] References Cited

U.S. PATENT DOCUMENTS 3,946,432  3/1976  Goldberg et al. ............ 341/122
4,204,199  5/1980  Isailovic ..................... 341/68

FOREIGN PATENT DOCUMENTS 59-92410  5/1984  Japan .
61-222072  10/1986  Japan .

Primary Examiner—William M. Shoop, Jr.
Assistant Examiner—Gary J. Romano

[57] ABSTRACT

A digital modulation signal is sampled by an A/D converter in a predetermined cycle. A phase interval P between a zero level crossing and the current sampling point using sampling data $S_{i+1}$ at the current sampling point and sampling data $S_i$ at a sampling point which is located one point before the current sampling point. A phase $P_{i+1}$ of the current sampling point is found using the phase interval P, a phase $P_i$ of the sampling point which is located one point before the current sampling point, a phase $P_{i-1}$ of a sampling point which is located two points before the current sampling point and a phase $P_{i-2}$ of a sampling point which is located three points before the current sampling point. A clock signal is detected using the phases $P_{i+1}$ and $P_i$. Digital data is detected using the phase interval P, the phase $P_{i+1}$ and the sampling data $S_i$ at the sampling point which is located one point before the current sampling point.

11 Claims, 5 Drawing Sheets

|  | P1 | P2 | P3 | P4 | P5 | P6 | P7 |
|---|---|---|---|---|---|---|---|
| CONVENTIONAL EXAMPLE | 0 | 32 | 1 | 33 | 1 | 33 | 2 |
| PRESENT INVENTION | 0 | 32 | 1 | 33 | 1 | 33 | 2 |

|  | P1 | P2 | P3 | P4 | P5 | P6 | P7 |
|---|---|---|---|---|---|---|---|
| CONVENTIONAL EXAMPLE | 1 | 33 | 3 | 35 | 3 | 35 | 6 |
| PRESENT INVENTION | 1 | 33 | 3 | 36 | 5 | 38 | 9 |

DIGITAL DATA DETECTOR

BACKGROUND OF THE INVENTION

1. Field of the Invention

The present invention relates generally to digital data detectors, and more particularly, to digital data detectors for detecting digital data from a digital modulation signal in a digital data transmission system.

2. Description of the Prior Art

Conventionally, various apparatuses for detecting digital data from a digital modulation signal have been proposed. As one example, a digital data detecting apparatus is disclosed in Japanese Laid-Open Patent Gazette No. 92410/1984. This apparatus detects digital data from a digital modulation signal in the following manner. The digital modulation signal is sampled at a frequency of m times (m>1) the channel bit rate. It is assumed that the digital modulation signal is sampled at a frequency of two times the channel bit rate. Sampling data $S_{i+1}$ at the current sampling point and sampling data $S_i$ at a sampling point which is located one point before the current sampling point are used to find a phase interval P between a point at which the digital modulation signal crosses a reference level and the current sampling point from the following equation. In this case phases of sampling points are represented by values of 0 to N-1 obtained by dividing a channel bit period into N equal divisions;

$$P = \frac{|S_{i+1}|}{|S_{i+1}| + |S_i|} \cdot N/2 \tag{1}$$

where N/2 is a value of one-half of a channel bit interval. A predetermined value (N/2) is added to a phase $P_i$ of the sampling point which is located one point before the current sampling point, to obtain an estimated value of a phase of the current sampling point. In addition, the estimated value of the phase of the current sampling point is corrected by the following equation, so that the phase $P_{i+1}$ of the current sampling point is calculated;

$$P_{i+1} = \{P - (P_i + N/2)\} \cdot K + P_i + N/2 \tag{2}$$

where K is a coefficient of $0 < K \leq 1$.

On the other hand, when the digital modulation signal does not cross the reference level between the current sampling point and the sampling point which is located one point before the current sampling point, the phase $P_{i+1}$ of the current sampling point is calculated from the following equation:

$$P_{i+1} = P_i + N/2 \tag{3}$$

A clock in synchronization with the digital modulation signal and digital data corresponding to the clock are detected in response to sampling data at each sampling point thus obtained and a phase of the sampling point.

Meanwhile, the data detecting apparatus can cope with multichannel input by sampling channels with different timing and sequentially converting the channels into signals to be inputted.

According to the above described conventional data detecting apparatus, when the digital modulation signal does not cross the reference level, the phase of the current sampling point is evaluated by equation (3), so that the phase interval between two adjacent sampling points always are a constant value N/2. Thus, if fluctuations in the frequency caused by a wow flutter or the like increase, a phase to be calculated cannot follow the fluctuations in the frequency, whereby data is erroneously detected.

Meanwhile, Japanese Laid-Open Patent No. 222072/1986 filed by the assignee of the present application discloses a digital magnetic recording and reproducing apparatus in which the clock extraction is determined by comparing phase information before and behind sampling data of a reproduced signal with each other and comparing magnitudes of the phase differences calculated from the sampling data with each other and the phase information is changed depending on the result of the determination.

SUMMARY OF THE INVENTION

An object of the present invention is to provide a digital data detector in which the erroneous detection of data is slight even if fluctuations in the frequency increase.

The digital data detector according to the present invention comprises sampling data detecting means, phase interval calculating means, phase calculating means, clock detecting means and data detecting means.

The sampling data detecting means samples a digital modulation signal at a constant frequency. The phase interval calculating means is responsive to sampled data detected by the sampling data detecting means and calculates a phase interval between a point at which a digital modulation signal crosses a reference level and the current sampling point. The phase calculating means is responsive to a phase of a sampling point which is located one point before and a phase of a sampling point which is located at least two points before the current sampling point for calculating a phase of the current sampling point.

Additionally, the clock detecting means is responsive to the phase of each sampling point calculated by the phase calculating means for detecting a clock signal in synchronization with the digital modulation signal. The data detecting means is responsive to the phase interval, the phase of the current sampling point and the clock signal for detecting digital data from the digital modulation signal.

In the digital data detector according to the present invention, the phase of the current sampling point is calculated in response to the phase of the sampling point which is located one point before and the phase of the sampling point which is located at least two points before the current sampling point. Thus, if the frequency of the the digital modulation signal fluctuates greatly, the phase of the current sampling point is precisely calculated following the fluctuations in the frequency. Therefore, the clock signal in synchronization with the digital modulation signal is precisely detected. Consequently, the digital data is precisely detected from the digital modulation signal.

According to the present invention, the phase of the current sampling point is calculated in response to the phase of the sampling point which is located one point before and the phase of the sampling point which is located at least two points before the phase of the current sampling point. Thus, even if the frequency of the digital modulation signal fluctuates greatly due to a wow flutter or the like, the digital data detector can cope with the fluctuations in the frequency, whereby the erroneous detection of data is slight.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 5A shows a case in which fluctuations in the frequency of a digital modulation signal are small and FIG. 5B shows a case in which fluctuations in the frequency of the digital modulation signal are large.

DESCRIPTION OF THE PREFERRED EMBODIMENTS

Figure 1:
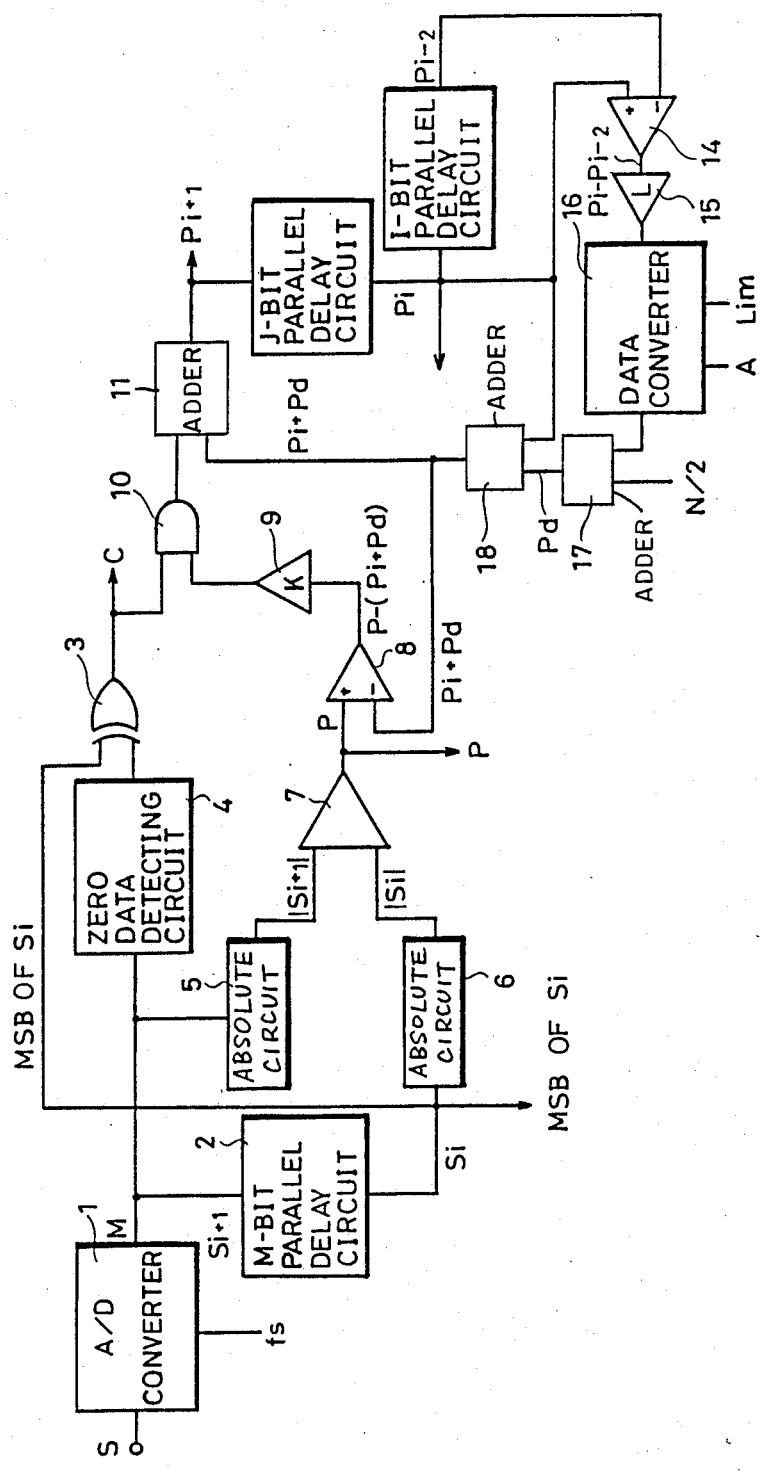
FIG. 1 is a block diagram showing a main portion of a digital data detector according to an embodiment of the present invention.

Referring now to the drawings, an embodiment of the present invention will be described.

As an example, description is made on a case in which digital data is detected from a digital modulation signal according to an NRZI type modulation scheme in the case of the minimum magnetization inversion interval (Tmin)=0.8 T and the maximum magnetization inversion interval (Tmax)=3.2 T.

Figure 2:
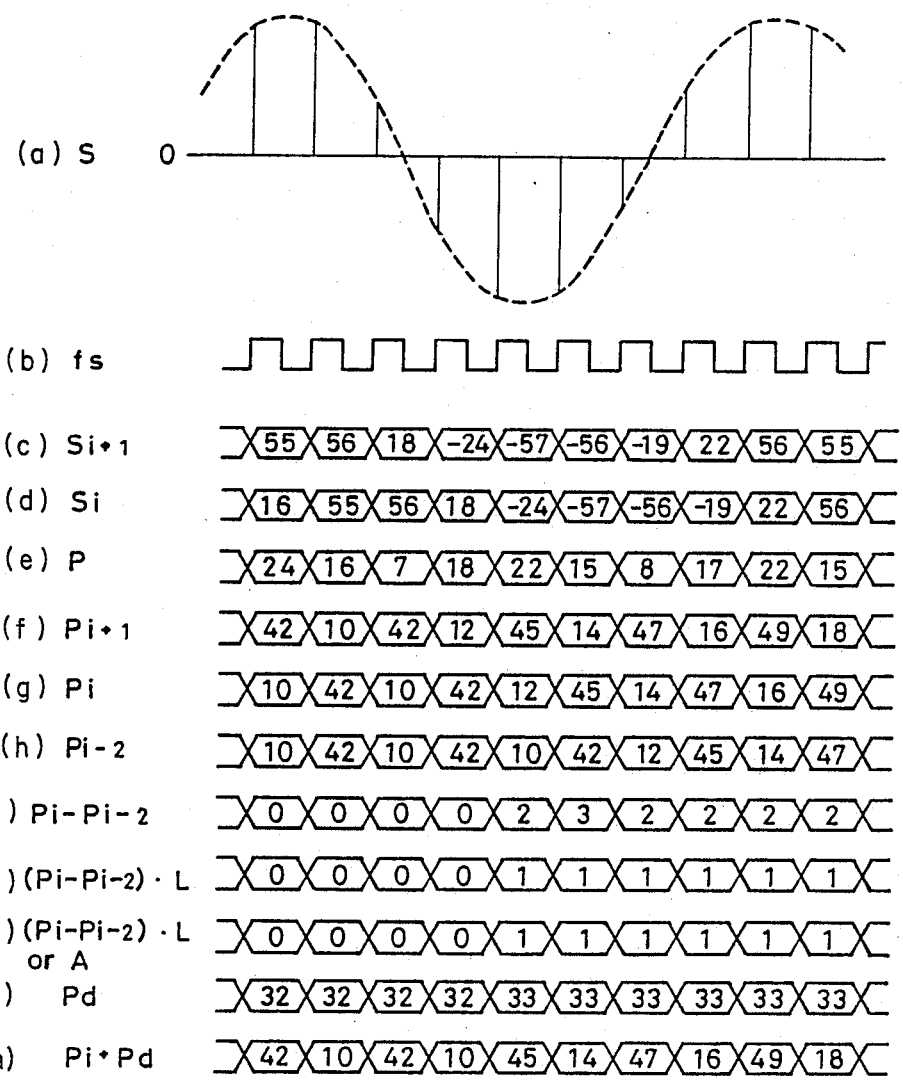
FIG. 2(a)-2(m) is a timing chart showing a signal of each portion according to the present embodiment.

FIG. 1 is a block diagram showing a main portion of a digital data detector according to the present invention. In this portion, a digital modulation signal is sampled in a predetermined cycle, so that sampling data at the sampling point is detected and the position, i.e., a phase of the sampling point is calculated. In addition, FIG. 2 is a timing chart for explaining an operation of the digital data detector.

In FIG. 1, a digital modulation signal S is inputted to an A/D converter 1. The A/D converter 1 samples the digital modulation signal S in synchronization with a clock signal $f_s$, to convert the same into M-bit digital data. The frequency of the clock signal $f_s$ is m times a channel bit rate. It is assumed that the frequency of the clock signal $f_s$ is two times the channel bit rate. Furthermore, in this conversion, the polarities of plus (+) and minus (−) of the digital modulation signal are represented by an MSB (Most Significant Bit) of "0" and "1" using two's complement, for example.

An output of the A/D converter 1 is inputted to a M-bit parallel delay circuit 2, a zero data detecting circuit 4 and an absolute value circuit 5 as sampling data (referred to as the current data below) $S_{i+1}$ at the current sampling point. An output of the M-bit parallel delay circuit 2 is inputted to an absolute value circuit 6 as sampling data (referred to as the preceding data below) $S_i$ at a sampling point which is located one point before the current sampling point.

The zero data detecting circuit 4 outputs "1" when the current data $S_{i+1}$ is "0" and the preceding data has negative polarity, i.e., the MSB is "1", which otherwise would output the MSB of the current data $S_{i+1}$. An output of the zero data detecting circuit 4 is applied to one input terminal of an exclusive OR gate (referred to as an Ex-OR gate below) 3. The MSB of the preceding data $S_i$ outputted from the M-bit parallel delay circuit 2 is applied to the other input terminal of the Ex-OR gate 3. The Ex-OR gate 3 outputs "1" when input signals applied to both the input terminals are different from each other while outputting "0" when the input signals are the same. Thus, when the output from the Ex-OR gate 3 is "1", the preceding data $S_i$ and the current data $S_{i+1}$ are different in polarity, so that it is determined that the digital modulation signal S has crossed a reference level (zero level) (referred to as zero-level crossing below). Contrary to this, when the output of the Ex-OR gate 3 is "0", the data $S_i$ and $S_{i+1}$ are the same in polarity, so that it is determined that the digital modulation signal S has not crossed the zero level.

It is assumed that with the current data $S_{i+1}$ being "0" (i.e., the sampling point being on the zero level), the current data $S_{i+1}$ and the preceding data $S_i$ are the same in polarity when the preceding data $S_i$ has negative polarity while the current data $S_{i+1}$ and the succeeding data are different in polarity when the succeeding data has positive polarity. In addition, it is assumed that with the current data $S_{i+1}$ being "0", the current data $S_{i+1}$ and the preceding data $S_i$ are the same in polarity when the preceding data $S_i$ has positive polarity while the current data $S_{i+1}$ and the succeeding data are different in polarity when the succeeding data has negative polarity.

On the other hand, the current data $S_{i+1}$ and the preceding data $S_i$ are converted into absolute values $|S_{i+1}|$ and $|S_i|$ by the absolute value circuits 5 and 6, respectively, to be inputted to an arithmetic circuit 7. The arithmetic circuit 7 calculates a phase interval P between a zero level crossing and the sampling point of the current data $S_i$ by using the following equation with the absolute value $|S_{i+1}|$ of the current data and the absolute value $|S_i|$ of the preceding data:

$$P = \frac{|S_{i+1}|}{|S_{i+1}| + |S_i|} \cdot N/2 \qquad (4)$$

In this case phases of sampling points are represented by values of 0 to N−1 obtained by dividing a channel bit period into N equal divisions, where N/2 represents the position of the zero level crossing.

A method for calculating the phase interval P using the equation (4) is employed in the digital magnetic recording and reproducing apparatus disclosed in the above described Japanese Laid-Open Patent No. 222072/1986.

The calculated phase interval P is compared with an output ($P_i$+Pd) of a phase loop (as described below) by a comparator 8, the result of comparison being outputted as {P−($P_i$+Pd)}. The output {P−($P_i$+Pd)} of the comparator 8 is corrected in numerical value by a coefficient K (0<K≦1) of a constant multiplier 9 corresponding to loop gain, to be outputted as {P−($P_i$+Pd)}·K. The output {P−($P_i$+Pd)}·K of the constant multiplier 9 is applied to one input terminal of a logical product gate (referred to as AND gate hereinafter) 10. The AND gate 10 has another input terminal receiving an output C of the above described Ex-OR gate 3. Consequently, only when the digital modulation signal S crosses the zero level so that the output C of the Ex-OR gate 3 becomes "1", the output $\{P-(P_i+Pd)\}\cdot K$ of the constant multiplier 9 is outputted from the AND gate 10, to be applied to one input terminal of an adder 11. The adder 11 has another input terminal receiving an output $(P_i+Pd)$ of the phase loop. The result of addition by the adder 11 becomes a phase $P_{i+1}$ of the current sampling point.

When there is zero level crossing between the sampling point which is located one point before the current sampling point and the current sampling point, the phase $P_{i+1}$ becomes as follows:

$$P_{i+1}=\{P-(P_i+Pd)\}\cdot K+P_i+Pd$$

Contrary to this, when there is no zero level crossing, the phase $P_{i+1}$ becomes as follows:

$$P_{i+1}=P_i+Pd$$

The phase $P_{i+1}$ is inputted to a J-bit parallel delay circuit 12.

An output of the J-bit parallel delay circuit 12 is applied to one input terminal of an adder 14, one input terminal of an adder 18 and an I-bit parallel delay circuit 13 (generally I=J) as a phase $P_i$ of the sampling point which is located one point before the current sampling point. The number of delays of the I-bit parallel delay circuit 13 is two. An output of the I-bit parallel delay circuit 13 becomes a phase $P_{i-2}$ of a sampling point which is located three points before the current sampling point. The output $P_{i-2}$ of the I-bit parallel delay circuit 13 is inputted to the other input terminal of the comparator 14, to be compared with the output $P_i$ of the above described J-bit parallel delay circuit 12. An output of the comparator 14 becomes $(P_i-P_{i-2})$. The output $(P_i-P_{i-2})$ is inputted to a constant multiplier 15 having a coefficient L $(0<L\leq 1)$ and corrected in numerical value, to be outputted as $(P_i-P_{i-2})\cdot L$.

The output $(P_i-P_{i-2})\cdot L$ of the constant multiplier 15 is applied to a data converter 16. The data converter 16 compares the input signal with a predetermined value Lim, to output a value A previously set when the following condition is satisfied while directly outputting the input signal when the following condition is not satisfied:

$(P_i-P_{i-2})\cdot L\geq$ Lim or $(P_i-P_{i-2})\cdot L\geq$ -Lim

The data converter 16 is provided for the following reasons. More specifically, when input data becomes invalid due to burst generation or the like, the phase calculated based on the input data also becomes invalid, so that the difference $(P_i-P_{i-2})$ between the two phases exceeds a range of a normal value. Since this affects the subsequent calculation of phases, the return to the normal value is delayed. When the value of $(P_i-P_{i-2})\cdot L$ is outside a predetermined range, the value is replaced with a value previously set.

An output of the data detector 16 is applied to one input terminal of an adder 17. The adder 17 has another input terminal receiving a signal corresponding to N/2. The result Pd of addition by the adder 17 becomes as follows:

$$Pd=(P_i-P_{i-2})\cdot L+N/2$$

The output Pd of the adder 17 is applied to the other input terminal of the adder 18. Since the phase $P_i$ of the sampling point which is located one point before the current sampling point is applied to one input terminal of the adder 18 as described above, $(P_i+Pd)$ is outputted from the adder 18.

The output $(P_i+$

The output $(P_i+Pd)$ is applied to the other input terminal of the adder 11 as an output of the phase loop, i.e., an estimated value of the phase of the current sampling point. As described above, the output of the AND gate 10 is applied to one input terminal of the adder 11. Thus, when the output C of the Ex-OR gate 3 is "1", the estimated value of the phase of the current sampling point is corrected based on the output of the AND gate 10. Consequently, the phase $P_{i+1}$ of the current sampling point is outputted from the adder 11.

Finally, the phase $P_{i+1}$ of the current sampling point is given as follows:

When there is zero level crossing, $$P_{i+1}=\{P-(P_i+Pd)\}\cdot K+P_i+Pd \tag{5}$$

when there is no zero level crossing,
$$P_{i+1}=P_i+Pd \tag{6}$$

where
$$Pd=(P_i-P_{i-2})\cdot L+N/2 \tag{7}$$

P denotes a phase interval between a zero level crossing and the current sampling point, which is calculated from the equation (4). $P_{i+1}$ denotes a phase of the current sampling point, $P_i$ denotes a phase of a sampling point which is located one point before the current sampling point, $P_{i-2}$ denotes a phase of a sampling point which is located three points before the current sampling point, N/2 denotes a value showing half of the channel bit interval, and K and L denote coefficients.

Description is now made of a method for detecting a clock in synchronization with the digital modulation signal S in response to the phase of each sampling point thus calculated.

Figure 3:
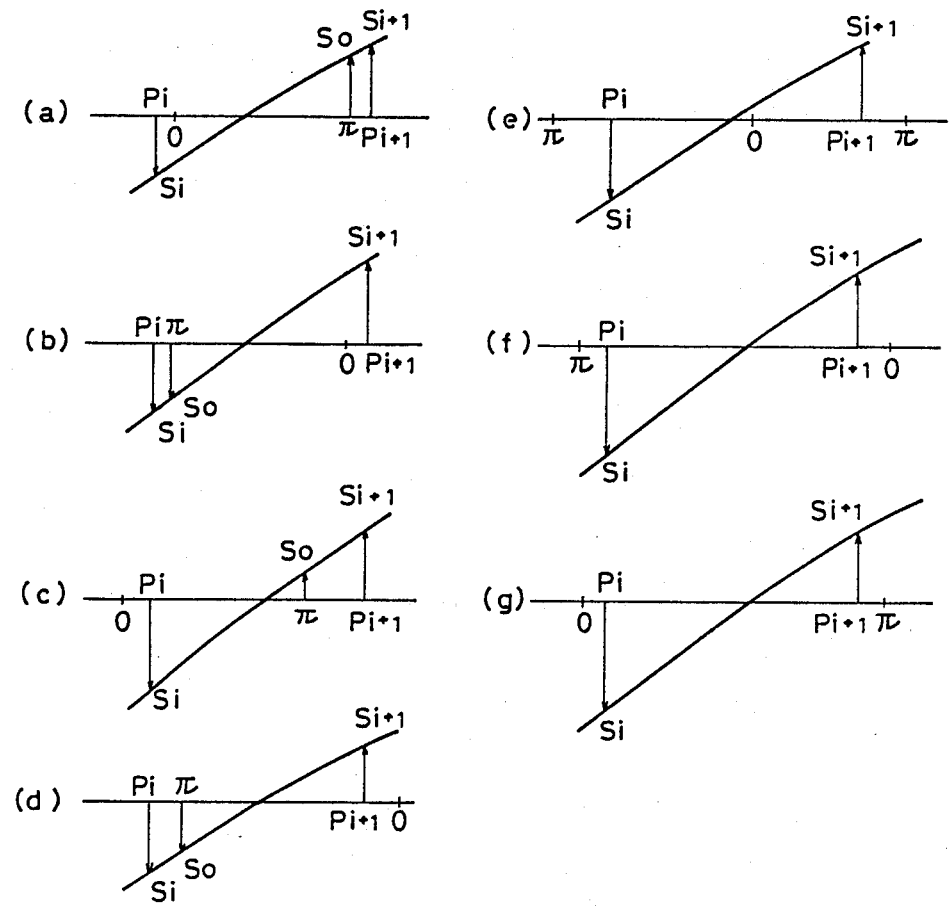
FIGS. 3(a) to 3(g) are diagrams for explaining clock extraction determining conditions according to the present embodiment.

FIG. 3 is a diagram for explaining clock detection determining criteria according to the present embodiment. FIGS. 3(a) to 3(d) show a case in which one $\pi$ point (a point of N/2 from the zero point) of the digital modulation signal S exists between $P_i$ and $P_{i+1}$, and FIGS. 3(e) to 3(g) show a case in which the above described $\pi$ point does not exist between $P_i$ and $P_{i+1}$.

In FIG. 3(a), the following condition is satisfied:

$P_i>P_{i+1}$, $P_i\geq N/2$, $P_{i+1}>N/2$

In addition, in FIG. 3(b), the following condition is satisfied:

$P_i>P_{i+1}$, $P_i<N/2$, $P_{i+1}<N/2$

Furthermore, in FIGS. 3(c) and 3(d), the following condition is satisfied:

$P_i<P_{i+1}$, $P_i<N/2$, $P_{i+1}\geq N/2$

When the conditions are satisfied, it is determined that one $\pi$ point exists between $P_i$ and $P_{i+1}$. Additionally, when sampling points continuously cross the zero level crossing, i.e., when the Ex-OR gate 3 continuously outputs "1", it is determined that the $\pi$ point exists irrespective of comparison of $P_i$ with $P_{i+1}$.

Under the above described clock detecting conditions, a clock in synchronization with the digital modulation signal is extracted by a circuit shown in FIG. 4 as described below. In addition, data corresponding to this clock is detected by the following condition.

More specifically, it is assumed that the above described data has generally a sign of the sampling data $S_i$ while having a sign of the sampling data $S_{i+1}$ when the output C of the Ex-OR gate 3 is "1" and the following condition is satisfied:

$$P > P_{i+1} - N/2$$

Figure 4:
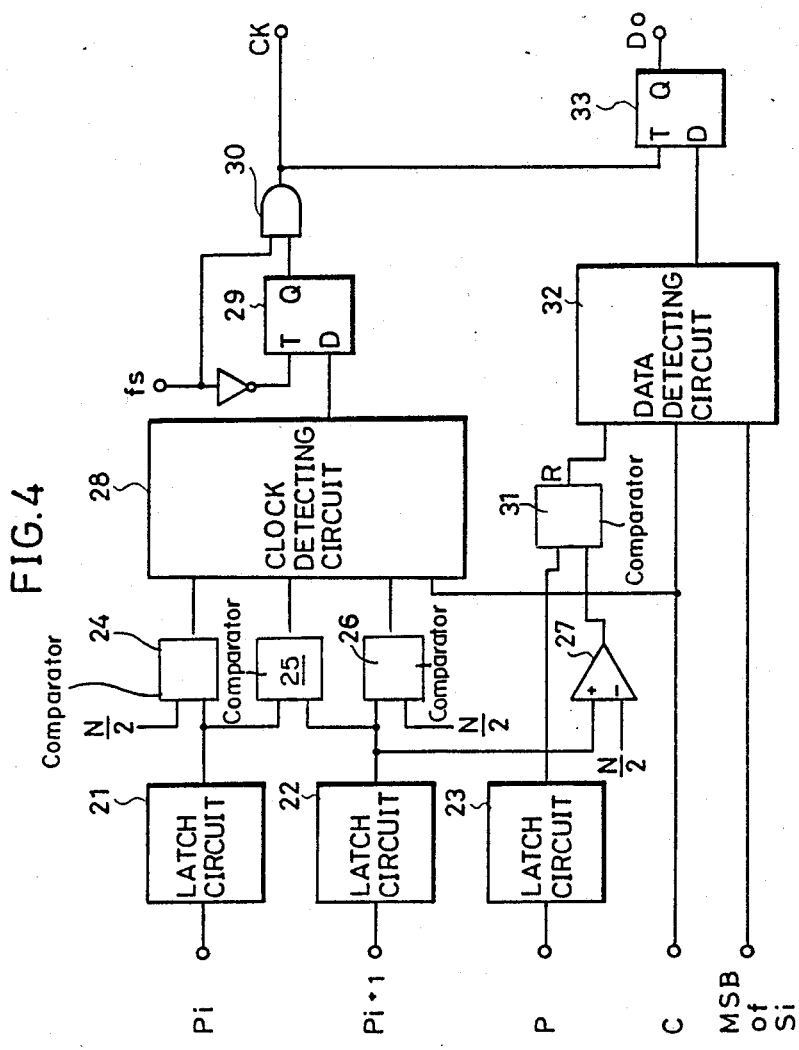
FIG. 4 is a block diagram showing specific structure of clock and data detecting circuits.

FIG. 4 is a block diagram showing a structure of circuits for detecting a clock and data based on the above described clock detecting criteria and the data determining condition.

In FIG. 4, a phase $P_i$ of a sampling point which is located one point before the current sampling point, a phase $P_{i+1}$ of the current sampling point and a phase interval P are applied to latch circuits 21, 22 and 23, respectively. The latch circuits 21, 22 and 23 hold $P_i$, $P_{i+1}$ and P at timing of a sampling frequency $f_s$, to output the same. An output of the latch circuit 21 is applied to one input terminal of a comparator 24 and one input terminal of a comparator 25. An output of the latch circuit 22 is applied to the other input terminal of the comparator 25, one input terminal of a comparator 26 and one input terminal of subtractor 27. In addition, a signal corresponding to N/2 is applied to the other input terminals of the comparator 24, the comparator 26 and the subtractor 27. The comparator 24 compares $P_i$ with N/2. The comparator 25 compares $P_i$ with $P_{i+1}$. The comparator 26 compares $P_{i+1}$ with N/2. Outputs of the comparators 24, 25 and 26 and the output C of the Ex-OR gate 3 (see FIG. 1) are applied to a clock detecting circuit 28.

The clock detecting circuit 28 outputs "1" when the above described clock detecting conditions are satisfied while outputting "0" when the clock detecting conditions are not satisfied. An output of the clock detecting circuit 28 is inputted to a data input terminal D of a flip-flop 29, to be acquired at timing of $\overline{f_s}$. An output of the flip-flop 29 is applied to one input terminal of an AND gate 30. The AND gate 30 has another input terminal receiving $f_s$. When both the input signals are "1", the AND gate 30 outputs "1" at timing of $f_s$, so that the output signal becomes a clock CK.

On the other hand, an output corresponding to $\{P_{i+1} - (N/2)\}$ is derived from the subtractor 27, the output being applied to one input terminal of a comparator 31. The comparator 31 has another input terminal receiving an output of the latch circuit 23. The comparator 31 outputs "1" when $P > P_{i+1} - N/2$, which otherwise would output "0". An output R of the comparator 31, a signal representing the sign of the preceding data $S_i$, i.e., an MSB of $S_i$ and the output C of the Ex-OR gate 3 are inputted to a data detecting circuit 32. The data detecting circuit 32 samples data in response to the inputted signal based on the above described data determining condition. More specifically, the data detecting circuit 32 generally outputs the sign of the sampling data $S_i$ as reproduced data while outputting the sign of the sampling data $S_{i+1}$, i.e., a signal obtained by inverting $S_i$ as reproduced data when the output C of the Ex-Or gate 3 is "1" and the output R of the comparator 31 is "1" (when the relation $P > P_{i+1} - N/2$ is satisfied). An output of the data detecting circuit 32 is inputted to a data input terminal D of a flip-flop 33 and outputted from the flip-flop 33 at timing of the clock CK, so that reproduced data $D_0$ synchronized with the clock CK is detected.

Figure 5A:
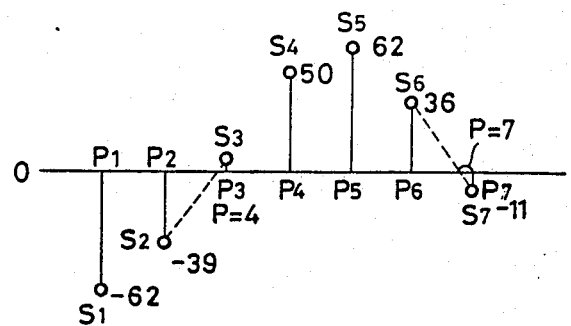
FIGS. 5A and 5B are diagrams for comparing a phase of a sampling point calculated according to the present embodiment with a phase of a sampling point calculated according to the conventional example, where
Figure 5B:
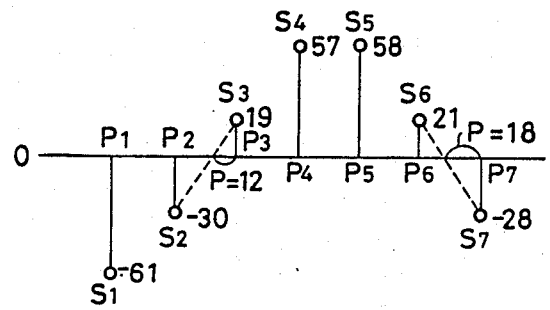

FIGS. 5A and 5B are diagrams in which the phase calculated by the digital data detector according to the present embodiment is compared with the phase calculated by the conventional data detecting apparatus.

FIG. 5A shows a case in which fluctuations in the frequency of the digital modulation signal are small, and FIG. 5B shows a case in which fluctuations in the frequency of the digital modulation signal are large. Assuming that $K = \frac{1}{4}$, $L = \frac{1}{2}$ and N/2 = 32, the phase of each sampling point is calculated.

When the fluctuations in the frequency are small, the results of calculations of phases $P_1$ to $P_7$ of sampling points in the present invention are the same as those in the conventional example. However, when the fluctuations in the frequency become larger, the results of calculation of the phases $P_1$ to $P_7$ of the sampling points in the present invention are different from those in the conventional example. The phases of the sampling points take values 0 to N−1. Thus, when the phase and the phase interval become a value exceeding N−1 in the calculation process, N (=64) is subtracted from the value.

In FIG. 5B, a sampling point S4 is described by way of example. In this case, there is no point at which the digital modulation signal S and the reference level (zero level) crosses each other between sampling points S3 and S4. Thus, the equation (3) and the equations (6) and (7) are used in the conventional example and the present embodiment, respectively.

In the conventional example, $P_4$ is found from the equation (3):

$$P_4 = P_3 + N/2$$

Substitution of $P_3 = 3$ and N/2 = 32 gives $P_4 = 35$.

In the present embodiment, $P_4$ is found from the equations (6) and (7):

$$P_4 = P_3 + (P_3 - P_1) \cdot L + N/2$$

Substitution of $P_1 = 1$, $P_3 = 3$, $L = \frac{1}{2}$ and N/2 = 32 gives $P_4 = 36$.

Then, a sampling point S7 is described by way of example. In this case, there is a point at which the digital modulation signal S and the zero level crosses each other between sampling points S6 and S7. Thus, P is found from the equation (4):

$$P = \frac{|S_7|}{|S_7| + |S_6|} \cdot N/2$$

Substitution of $S_6 = 21$ and $S_7 = -28$ gives P = 18.

In the conventional example, $P_7$ is found from the equation (2):

$$P_7 = \{P - (P_6 + N/2)\} \cdot K + P_6 + N/2$$

Substitution of P = 18, $P_6 = 35$, N/2 = 32 and $K = \frac{1}{4}$ gives $P_7 = 6$. However, $P_6 + N/2 = 67$, which exceeds N−1 (=63). Thus, N (=64) is subtracted from 67, so that 3 is obtained. $P_7$ is calculated assuming $P_6 + N/2 = 3$. In addition, the figures after the decimal point are neglected.

In the present embodiment, Pd is first found from the equation (7):

$$Pd = (P_6 - P_4) \cdot L + N/2$$

Substitution of $P_4 = 36$, $P_6 = 38$, $L = \frac{1}{2}$ and $N/2 = 32$ gives $Pd = 33$. Thus, $P_7$ is found from the equation (5):

$$P_7 = \{P - (P_6 + Pd)\} \cdot K + P_6 + Pd$$

Substitution of $P = 18$, $P_6 = 38$, $Pd = 33$ and $K = \frac{1}{4}$ gives $P_7 = 9$. However, $P_6 + Pd = 71$, which exceeds 63. Thus, 64 is subtracted from 71, so that 7 is obtained. $P_7$ is calculated assuming $P_6 + Pd = 7$.

A reference point for obtaining the phase of each sampling point is a zero level crossing. Thus, the closer the phase $P_{i+1}$ of the sampling point is to the phase interval P between the zero level crossing and the sampling point, the more satisfactorily data to be detected follows the fluctuations in the frequency of the digital modulation signal.

The above described calculation results in $P_7 = 6$ in the conventional example while resulting in $P_7 = 9$ in the present embodiment. $P_7$ in the present embodiment is a value closer to the phase interval $P = 18$. Thus, the detection of digital data is less erroneously.

Although in the above described embodiment, description was made on the case of input of one channel, in the case of input of Y channels, the channels may be sampled at different timing and the number of delays of the parallel delay circuits 2 and 12 and the number of delays of the parallel delay circuit 13 may be made Y and 2Y, respectively.

Although in the above described embodiment, description was made on the NRZI type modulation scheme in the case of $Tmin = 0.8$ T and $Tmax = 3.2$ T, it should be noted that the present invention is not limited to the same. For example, the present invention can be applied to the other modulation schemes such as an NRZ type modulation scheme.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital data detector comprising:
   sampling data detecting means for sampling a digital modulating signal at a constant frequency;
   phase interval calculating means, responsive to sampling data detected by said sampling data detecting means, for calculating a phase interval between a point at which said digital modulating signal crosses a reference level and a current sampling point;
   phase calculating means, responsive to phases of a sampling point which is located one point before and a sampling point which is located at least two points before said current sampling point, for calculating a phase of said current sampling point;
   clock detecting means, responsive to the phases of the sampling points calculated by said phase calculating means, for detecting a clock signal in synchronization with said digital modulation signal; and
   data detecting means, responsive to said phase interval, the phase of said current sampling point and said clock signal, for detecting digital data from said digital modulation signal.

2. The digital data detector according to claim 1, wherein said sampling data detecting means comprises analog to digital converting means for analog to digital converting said digital modulation signal in synchronization with a clock having said constant frequency.

3. The digital data detector according to claim 1, wherein said phase interval calculating means finds a phase interval P between the point at which said digital modulation signal crosses said reference level and the current sampling point from the following equation, using sampling data $S_{i+1}$ at the current sampling point and sampling data $S_i$ at the sampling point which is located one point before the current sampling point:

$$P = \frac{|S_{i+1}|}{|S_{i+1}| + |S_i|} \cdot N/2$$

where phases of sampling points are represented by values of 0 to $N-1$ obtained from dividing means for dividing a channel bit period into N equal divisions.

4. The digital data detector according to claim 1, wherein said phase calculating means finds a phase $P_{i+1}$ of the current sampling point from the following equation when the point at which said digital modulation signal crosses said reference level exists between the sampling point which is located one point before the current sampling point and the current sampling point:

$$P_{i+1} = \{P - (P_i + Pd)\} \cdot K + P_i + Pd$$

while finding the phase $P_{i+1}$ of the current sampling point from the following equation when the point at which said digital modulation signal crosses said reference level does not exist between the sampling point which is located one point before the current sampling point and the current sampling point:

$$P_{i+1} = P_i + Pd$$

where $Pd = (P_i - P_{i-2}) \cdot L + N/2$; phases of sampling points are represented by values 0 to $N-1$ obtained by dividing a channel bit period into N equal divisions; P denotes a phase interval between the point at which said digital modulation signal crosses said reference level and the current sampling point; $P_i$ denotes a phase of a sampling point which is located one point before the current sampling point; $P_{i-1}$ denotes a phase of a sampling point which is located two points before the current sampling point; $P_{i-2}$ denotes a phase of a sampling point which is located three points before the current sampling point; and K and L denote coefficients.

5. The digital data detector according to claim 1, wherein said clock detecting means determines that one $\pi$ point of said clock signal exists between the current sampling point and the sampling point which is located one point before the current sampling point when any of the following conditions is satisfied:

(a) $P_i > P_{i+1}$ and $P_i \geq N/2$ and $P_{i+1} \geq N/2$ (b) $P_i > P_{i+l}$ and $P_i < N/2$ and $P_{i+1} < N/2$ (c) $P_i < P_{i+1}$ and $P_i < N/2$ and $P_{i+1} \geq N/2$ where phases of sampling points are represented by values of 0 to $N-1$ obtained from dividing means for dividing a channel bit period into N equal divisions; $P_{i+1}$ denotes a phase of the current sampling point; and $P_i$ denotes a phase of a sampling point which is located one point before the current sampling point.

6. The digital data detector according to claim 1, wherein said data detecting means outputs a sign of sampling data $S_{i+1}$ at the current sampling point as reproduced data when the point at which said digital modulation signal crosses said reference level exists between the sampling point which is located one point before the current sampling point and the current sampling point and the relation $P > P_{i+1} - N/2$ is satisfied, which otherwise would output a sign of sampling data $S_i$ at the sampling point which is located one point before the current sampling point as reproduced data, where phases of sampling points are represented by values of 0 to $N-1$ obtained from dividing means for dividing a channel bit period into N equal divisions; P denotes a phase interval between the point at which said digital modulation signal crosses said reference level and the current sampling point; and $P_{i+1}$ denotes a phase of the current sampling point.

7. The digital data detector according to claim 3, wherein said phase interval calculating means comprises
   delay means for finding said sampling data $S_i$,
   absolute value means for finding an absolute value $|S_i|$ of said sampling data $S_i$,
   absolute value means for finding an absolute value $|S_{i+1}|$ of said sampling data $S_{i+1}$, and
   an arithmetic circuit for finding said phase interval P using said absolute values $|S_i|$ and $|S_{i+1}|$.

8. The digital data detector according to claim 4, wherein said phase calculating means comprises:
   means for determining whether or not the point at which said digital modulation signal crosses said reference level exists between the sampling point which is located one point before the current sampling point and the current sampling point,
   first delay means responsive to the phase $P_{i+1}$ for outputting the phase $P_i$,
   second delay means responsive to the output of said first delay means for outputting the phase $P_{i-2}$,
   first arithmetic means responsive to the outputs of said first delay means and said second delay means for outputting said Pd,
   second arithmetic means responsive to the outputs of said first delay means and said first arithmetic means for outputting $(P_i + Pd)$,
   third arithmetic means responsive to said phase interval P and the output of said second arithmetic means for outputting $\{P - (P_i + Pd)\} \cdot K$,
   logic means responsive to the outputs of said detecting means and said third arithmetic means for outputting said $\{P - (P_i + Pd)\} \cdot K$ when said point at which said digital modulation signal crosses said reference level is detected while outputting "0" when said point at which said digital modulation signal crosses said reference level is not detected, and
   adding means responsive to the outputs of said logic means and said second arithmetic means for applying the result of addition thereof to said first delay means as said phase $P_{i+1}$.

9. The digital data detector according to claim 5, wherein said clock detecting means comprises
   first comparing means for comparing said phase $P_i$ with said N/2,
   second comparing means for comparing said phase $P_i$ with said phase $P_{i+1}$,
   third comparing means for comparing said phase $P_{i+1}$ with said N/2,
   clock determining means responsive to outputs of said first, second and third comparing means for outputting a first determination signal when any of said conditions (a), (b) and (c) is satisfied, which otherwise would output a second determination signal, and
   clock outputting means responsive to a signal having said constant frequency for outputting the output of said clock determining means.

10. The digital data detector according to claim 6, wherein said data detecting means comprises
    first comparing means for comparing said phase $P_{i+1}$ with said N/2,
    second comparing means for comparing an output of said comparing means with said phase interval P, and
    detecting means responsive to determination whether or not said point at which said digital modulation signal crosses said reference level and said second comparing means and said sampling data $S_{i+1}$ of the current sampling point for outputting the reproduced data.

11. The digital data detector according to claim 8, wherein said first arithmetic means comprises
    forth arithmetic means for finding $(P_i - P_{i-2}) \cdot L$ using said phase $P_i$ from said first delay means, said phase $P_{i-2}$ from said second delay means and said coefficient L,
    fifth arithmetic means for comparing said $(P_i - P_{i-2}) \cdot L$ with a predetermined value Lim to output a previously set value when the condition $(P_i - P_{i-2}) \cdot L \geq \text{Lim}$ or $(P_i - P_{i-2}) \cdot L \leq -\text{Lim}$ is satisfied while outputting said $(P_i - P_{i-2}) \cdot L$ when said condition is not satisfied, and
    sixth arithmetic means for adding an output of said fifth arithmetic means to said N/2 to output the result of addition as said Pd.

* * * * *